United States Patent [19]

Zink

[11] E Patent Number: Re. 31,695

[45] Reissued Date of Patent: Oct. 2, 1984

[54] TWO SIDED COATER

[75] Inventor: Stanley C. Zink, Fulton, N.Y.

[73] Assignee: The Black Clawson Company, Middletown, Ohio

[21] Appl. No.: 508,384

[22] Filed: Jun. 27, 1983

Related U.S. Patent Documents

Reissue of:

[64] Patent No.: 4,354,449
Issued: Oct. 19, 1982
Appl. No.: 195,560
Filed: Oct. 9, 1980

U.S. Applications:

[63] Continuation-in-part of Ser. No. 921,502, Jul. 3, 1978, Pat. No. 4,231,318, and Ser. No. 34,216, Apr. 30, 1979, abandoned.

[51] Int. Cl.[3] ..... B05C 1/08; B05D 3/12; B05D 1/28

[52] U.S. Cl. ..... 427/211; 118/126; 118/206; 118/246; 118/410; 118/419; 427/356; 427/361; 427/428

[58] Field of Search ..... 118/126, 206, 246, 248, 118/259, 261, 407, 410, 411, 413, 419; 427/211, 356, 361, 428

[56] References Cited

U.S. PATENT DOCUMENTS

| | | | |
|---|---|---|---|
| 3,293,067 | 12/1966 | Streb et al. | 118/206 X |
| 3,418,970 | 12/1968 | Phelps | 118/410 |
| 4,022,151 | 5/1977 | Achelpohl | 118/246 |
| 4,076,864 | 2/1978 | Wallsten | 427/211 X |
| 4,177,304 | 12/1979 | Berry | 427/211 X |
| 4,231,318 | 11/1980 | Zinc | 118/122 |
| 4,250,207 | 2/1981 | Takahashi et al. | 118/223 |

*Primary Examiner*—Michael R. Lusignan
*Attorney, Agent, or Firm*—Biebel, French & Nauman

[57] ABSTRACT

Two side coaters and methods of coating paper on both sides are disclosed in which a web of paper to be coated is moved in a generally upward direction in partially wrapped relation to a coating roll, so that one side of the web is in contact with and supported by the roll. This one side of the web is coated by a first coating material which is applied by the coating roll. This coating material is applied to the coating roll by an applicator roll, either directly in which a puddle is formed between the applicator roll and the coating roll, or through transfer from a pair of metering rolls in which the coating puddle is formed between the metering rolls. A second coating, which may be the same as or different from the first coating, is applied by a non-contacting jet fountain coater to an area on the opposite exposed side of the web just ahead of or including the area which is in wrapped relation to the coating roll, and the excess coating is blade doctored, employing the coating roll as a back-up roll for the doctor blade. The [blade] *web* side moves upwardly in view of the operator and is turned for subsequent drying or the like with the blade side up. There are also disclosed arrangements by which the lead-in and lead-out angles of the web may be controlled for the purpose of controlling the angle of contact and degree of wrap of the web with the coating roll. The method further contemplates conventional blade doctoring, bent-blade doctoring, and zero-angle blade doctoring.

10 Claims, 10 Drawing Figures

TWO SIDED COATER

Matter enclosed in heavy brackets [ ] appears in the original patent but forms no part of this reissue specification; matter printed in italics indicates the additions made by reissue.

RELATED APPLICATIONS

This application is a continuation-in-part of my application Ser. No. 921,502, filed July 3, 1978 and now U.S. Pat. No. 4,231,318, and my application Ser. No. 34,216, filed Apr. 30, 1979, and now abandoned.

BACKGROUND OF THE INVENTION

This invention relates to a coating apparatus and method by which a web of paper or the like may be coated on its opposite sides either with the same or with different coating materials.

Various arrangements have been proposed by which webs may be coated simultaneously on both sides with similar or dissimilar coatings. One such arrangement is described and claimed in the above co-pending application Ser. No. 921,502, which discloses a dual blade type of coater in which a web of paper is moved upwardly between a pair of opposed non-contacting fountains and the excess materials are removed by a pair of co-acting doctor blades. The doctor blades are mounted for pivotal movement about a common axis.

It is desirable in some instances to utilize a conventional roll-type applicator for applying a coating or sizing material to one side of the web. One patent which discloses a roll applicator in a two-sided coater is Wallsten, U.S. Pat. No. 3,899,615 issued Aug. 12, 1975. In Wallsten, the web moves in a generally downwardly direction over a coating roll, from which the web receives one coating. The opposite side of the web is contacted by a coating blade which forms a dam and creates a reservoir above the blade for a coating material.

Such coaters are difficult to operate for a number of reasons. First, the blade-coated side is moving downwardly away from the coater and therefore is not presented as the top side for immediate drying or cooling systems. Secondly, the entire amount of the excess coating must be controlled by the blade alone, which places a severe demand upon the blade and limits the operator's ability to choose coating weights and web speeds. Very light [coatig] *coating* weights, or accurate control of coating weights, is rendered quite difficult. Further, since the paper is exiting the coater in the downward direction, it is difficult to provide a good operator vantage point for observing the coated web as it leaves the blade.

SUMMARY OF THE INVENTION

This invention is directed to two-side coaters which utilize the unique advantages of a jet-type fountain to apply coating to one side of a moving web or sheet of material, and a roll coater to apply the same or a different coating to the opposite side. The sheet moves in a generally upward direction between a coating roll which also forms a backing roll for the sheet, while a carefully controlled amount of coating is applied by a non-contacting jet-type fountain at the opposite side of the web. The excess material on the open side is removed by a blade and the blade side is then presented as the exposed upper surface for application to a drying or a cooling system.

The two-sided coater of this invention may be used in combination with a lead in and/or lead out roll mounted for adjustment or movement about an axis so that the angle of contact of the web with the coating roll may be varied and controlled in operation to provide for fine adjustment of the coating weight.

In a further arrangement, a plurality of smoothing rolls receive the web exiting from the coater and provide means for changing the web direction while smoothing one of the wet coated surfaces.

The coater of this invention has certain advantages. It provides an arrangement by which an existing, blade, roll or transfer roll coater may be converted into one for coating both sides of a web. It also provides a coater which employs a jet-type fountain and blade coater on one side and differential roll coater on the other side with a web lead exiting the blade in a generally upward direction. The blade coated side is thus presented up to the drying or the cooling systems. The arrangement further provides for the varying of the coating weights independently to either side of the web. An advantage of the arrangement permits the conventional coating on one side and the employment of a back side curl control, all at one coating station. The coater may be designed to handle very light weight papers with a minimum of web breaks and a minimum of the formation of roll split/film pattern.

The employment of a jet-type fountain applicator for coating of one side of the web has a further advantage of providing for a wide range of blade angles from a "zero" angle arrangement in which the blade is held with its flat side against the surface of the paper, to a condition in which a beveled blade contacts the paper at 55° or more. The fountain applicator is preferably mounted for both lateral and pivotal adjustment with respect to the coating roll, and the blade is also preferably mounted on a support which provides for pivotal movement of the blade about an axis which is generally coincidental with the point or region at which the blade contacts the web.

In many instances it is desirable to apply rather heavy coating weights to certain kinds of papers. Often this requirement for relatively heavy coating weights, in excess of 10 lbs. per ream, is accompanied by a reduction in the viscosity of the coating. Often the typically high viscosity starch systems are replaced by systems in which low viscosity latex is applied to provide an ultrasmooth, high-gloss finish when the paper is calendered. However, the reduction in coating viscosity from about 1500 cps down to 1000 cps for a given web spread results in a substantial reduction in the hydrodynamic forces at the tip of the beveled blade, and the result is an unsatisfactorily low coating weight.

In the present invention, the doctor blade may be operated at a low angle to the web, such as by use of a bent blade or a "zero" angle blade, to permit the metering of higher coat weights. By using a jet-type fountain applicator, a high quality heavy weight coating can be achieved at relatively low speeds, such as down to 100 feet per minute or lower, while simultaneously applying a sizing coating or a curl control liquid to the opposite side by means of the coating roller. As a result, the coater is capable of applying 12 lbs. or more per ream at speeds down to 100 feet per minute or slower, where that may be desired.

The invention is also further directed to a method of coating a paper web on both sides. The method includes the steps of moving the paper web in a generally upward direction in partially wrapped relation to an elastomer covered coating roll in which a first side of the web is positioned against or is in contact with the roll, and applying a coating material to this first side by the coating roll. A second coating is impinged on the outer or opposite side of the web with a non-contacting coater, at or just ahead of the area where the web wraps the coating roll, and the excess coating is blade doctored off by employing the coating roll as a backing roll for the doctor blade. The method further includes the turning of the coated web so as to expose the blade doctored side up for subsequent drying, and also includes the step of varying the entrance and/or exit angle of the web of the coating roll for the purpose of making fine adjustments in the coating pattern.

These and other objects and advantages of the invention will be apparent from the following description, the accompanying drawings and the appended claims.

DESCRIPTION OF THE PREFERRED EMBODIMENTS

Figure 1:
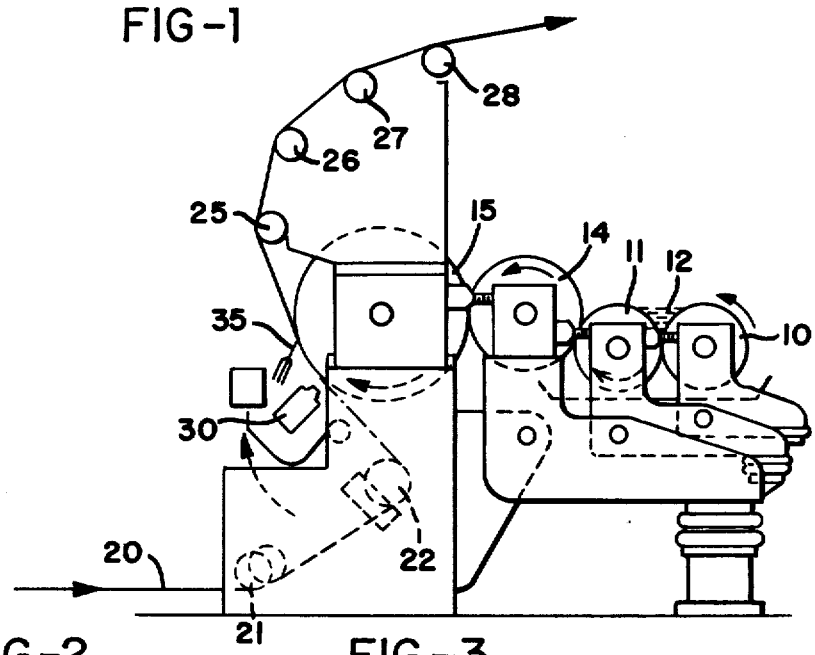
FIG. 1 is a side elevation, partially diagrammatic, of an offset roll coater in accordance with this invention.

Referring to FIG. 1, a double-sided coater is illustrated as employing a pair of pick-up and metering rolls 10 and 11 which form or define a puddle 12 therebetween for metering a first coating material onto an intermediate applicator roll 14. The applicator roll 14 is, in turn, in running engagement with a resilient backing roll 15. A web of paper to be coated is brought over a guide roll 21 and a tension roll 22 in partially wrapped relation to the outer surface of the backing roll 15. The web 20 exits in a generally upward direction over a plurality of driven smoothing rolls 25, 16, 27 and 28 which turn the direction of web movement for exit to a dryer. In the place of the smoothing rolls, a single air flotation roll or a driven chill roll may be employed with the embodiment of FIG. 1 as described in further detail in connection with the embodiments shown in FIGS. 2 and 3. The applicator roll may run at the surface speed of the backing roll down to approximately 5% of this speed, while the resilient backing roll 15 may operate at web speed or may be operated at a differential speed to the web, such as plus or minus 5% of web speed, to minimize roll/film split pattern.

Means for applying a second coating to the web includes a noncontacting applicator in the form of a jet fountain 30. The fountain 30 may be made in accordance with the teachings of Phelps et al, U.S. Pat. No. 3,418,970 issued Dec. 31, 1968 or Coghill, U.S. Pat. No. 3,521,602 issued July 28, 1970. The fountain applicator 30 is operated in noncontacting relation to the web and causes a transverse, controlled stream of coating material (identified as 31 in FIGS. 2 and 3), which may be the same as or different from the coating materials in the puddle 12, to impinge against the outer exposed surface of the web 20, either at the point where the web comes into contact with the backing roll 15 or at a region immediately preceding web contact with the backing roll. With the stream 31 of coating material, adjustable in width, caused to impinge on the web by the applicator 30 in noncontacting relation with the web, wrinkles or the like-can pass by the fountain 30. The fountain itself does not introduce any drag on the web 20 and can also produce uncoated dry edges on the blade side.

The amount of applied coating may be carefully controlled at the fountain. The excess coating is removed by the doctor blade 35 upstreams of the fountain 30. The doctor blade 35 may be supported on a doctor blade assembly as described in Zink, U.S. Pat. No. 3,882,817 issued May 13, 1975. The blade 35 is preferably mounted for pivotal adjustment or movement about a transverse axis, which axis is coincidental or substantially coincidental with the transverse region of blade contact with the web 20. Such a blade assembly mounting relationship, and the apparatus therefor, is described in Coghill, U.S. Pat. No. 3,187,718 issued June 8, 1965.

Figure 10:
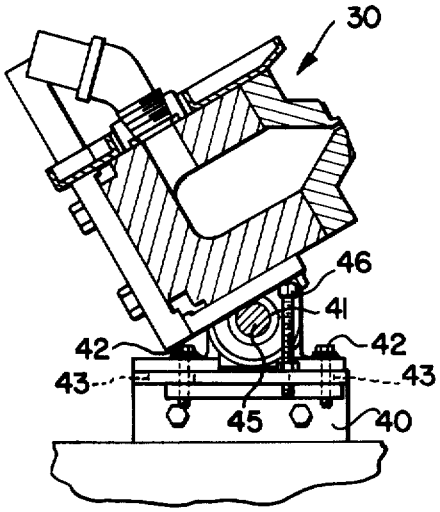
FIG. 10 shows an adjustable mounting for the fountain coater in FIGS. 1–5.

The fountain 30 should also be mounted for lateral and pivotal movement with respect to the coating roll 15, and FIG. 10 shows a mounting of this purpose which is disclosed in the above application Ser. No. 921,502. It comprises a pair of generally L-shaped brackets 40 on which bearings 41 are mounted for sliding movement on brackets 20 by bolts 42 in slots 43 in the brackets. The fountain 30 is in turn supported for pivotal movement by shaft 45 journaled in bearings 41, and means are provided for holding the fountain in any desired position of pivotal adjustment, such as a stop bolt 46 mounted in one of brackets 40.

The web 20 exits or leaves the backing roll 15, which is also the coater roll for the coating applied on the back side of the web, at an angle which is preferably less than the tangent angle of the blade. The operator, who will normally be observing the coating operation from the fountain side of the coater, has a clear view of the coated web at the blade side as it passes upwardly over the driven smoothing rolls. The smoothing rolls turn with the blade side up for delivery into a dryer or the like.

The width of coating on either side may be readily adjusted as desired. As noted above the fountain applicator may be restricted as to the effective width of the die opening to control coating width, in the manner taught in the above-identified Coghill patent, U.S. Pat. No. 3,521,602. The roll applicator may be configured to define the width of coating applied by the backing roll 15 by suitably undercutting the roll 15 and the applicator roll 14 to coincide with the desired coating width. In addition, edge dams or other contacting edge deckles may be employed for coating width control as disclosed in Schneider et al, U.S. Pat. No. 3,104,182 issued Sept. 17, 1963. Further, it is contemplated that full width water sprays may be supplied for each of the coating rolls in order to assist in starting the coating process and for cleaning up afterward.

Figure 6:
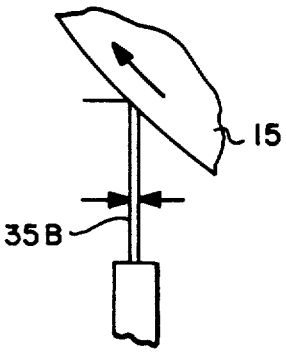
FIGS. 6–9 illustrate doctor blade arrangements which may be employed with the present invention.
Figure 7:
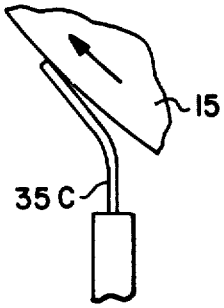
Figure 8:
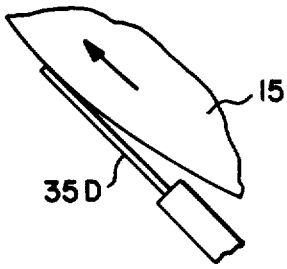

An important feature of the method of the present invention resides in the adjustment of the angle of the doctor blade 35 to run at a minimum of "zero" angle up to 55° or more, as illustrated in FIG. 6, 7 and 8. FIG. 6 illustrates a conventional blade adjustment in which a relatively thin blade 35B of a thickness as small as 0.010 inch or up to 0.025 inch or greater, is brought into contact with the blade doctoring maintained at the blade tip, and with the adjustment of blade angle being about the contact region of the blade tip with the web against the backing roll, in the manner taught in the above patent of Coghill, U.S. Pat. No. 3,187,718.

It is also contemplated that flexible blade coating may be employed, in the manner illustrated in FIG. 7, in which an elongated metal or elastomeric blade 35C is urged against the web and is caused to bend in the direction of web movement, thereby presenting a relatively flat blade surface to the web for applying relatively heavier coatings.

FIG. 8 illustrates the employment of a "zero" angle adjustment for the blade 35D. Thus in FIG. 8, a very small or "flat" blade angle is employed where it is desired to increase the coating weight even further. This is of particular advantage when operating at relatively low speed, such as 100 feet per minute. In such an instance, the flatter the blade the higher will be the coating weight. For all practical purposes, the low angle blade approach shown in FIG. 8 can provide as much as ½ inch of blade contact without causing the blade to bend appreciably.

Figure 9:
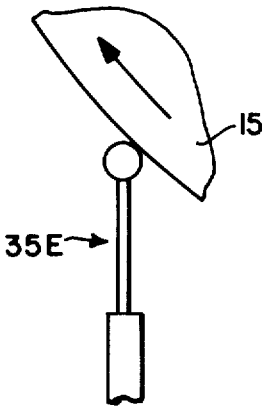

Since the blade 35, with the jet applicator, does not have to support a puddle or a head of coating, conventional flexible metering rods may be employed, such as the blade and rod combination 35E as shown in FIG. 9. Typical metering rods are shown in Warner, U.S. Pat. No. 3,084,663 issued Apr. 9, 1963 and Barnscheidt et al, U.S. Pat. No. 3,817,208 issued June 18, 1974.

Figure 2:
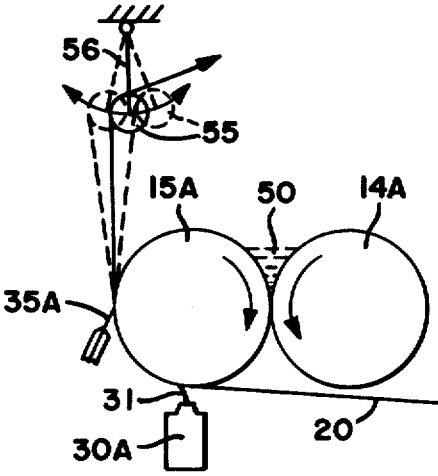
FIG. 2 is a diagram of a two-roll embodiment of the invention.
Figure 3:
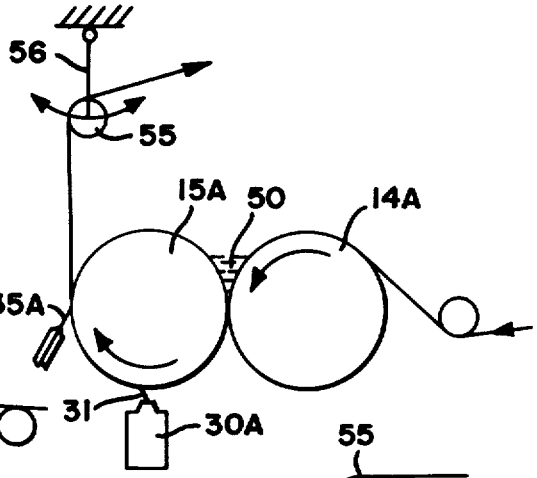
FIG. 3 is a diagram showing another arrangement for utilizing the two-roll embodiment of FIG. 2.

FIG. 2 and 3 illustrate further embodiments of the invention and illustrate additional methods by which the invention herein may be practiced. These embodiments show the employment of the invention with a two roll-type coater in which the applicator backing roll 15A is elastomer covered and defines a coating puddle 50 with the roll 14A. Roll 14A may operate at web speed down to about 5% of web speed, while roll 15A may operate substantially at web speed, plus or minus 5%.

Figure 4:
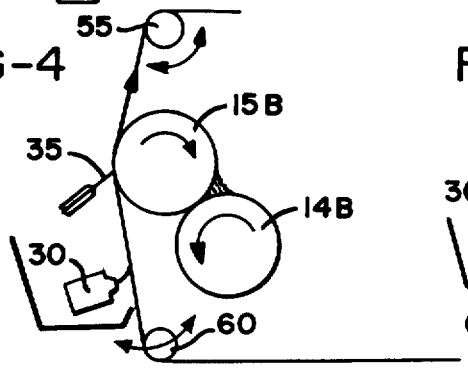
FIG. 4 shows a modified arrangement of the invention employing a pair of inclined roll applicators, and in which the fountain is shown as being positioned ahead of the wrap of the web on the backing roll.
Figure 5:
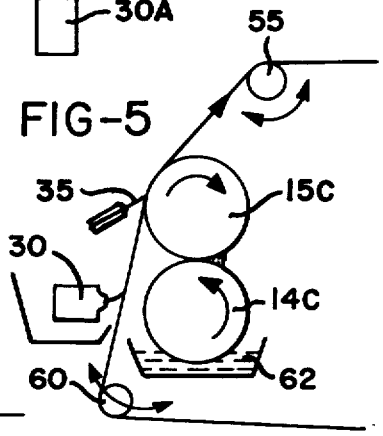
FIG. 5 illustrates a further adaptation of the two-sided coater of the invention as applied to a pair of vertical coating rolls.

In the embodiment of FIG. 2, the web 20 is shown as being brought beneath the rolls 14A and 14B and upwardly over the backing roll 15A in a minimum wrapped relation thereto, and exiting in a generally upward direction. The fountain applicator 30A is shown as being positioned generally at a one-inch gap relation to the web 20 to apply the second coating thereto. While the fountain 30A is shown in FIGS. 2 and 3 as positioned below the region where the web is initially contacts the roll 15A, the fountain may be positioned either upstream or downstream of this position, as desired, to vary the dwell time of the coating on the web before coming into contact with the doctor blade 35A. The most common position will be with the jet of coating 31 impinging against an unsupported web as shown in FIGS. 4 and 5.

Again, the coating material applied by the fountain 30A may be the same as or different from that in the puddle 50. In fact, in many applications of the invention, a starch coating may be applied at the puddle 50 by the roll 15A, while a conventional clay coating or a carbonless type coating may be applied by the jet fountain 30A. This includes the ability to produce CFB in one coating station.

In the embodiment of FIG. 3, the web 20 is shown as being brought over the roll 15A and through the nip therebetween, and downwardly around the bottom of the roll 15A, in which the puddle 50 is defined by one surface of the web 20 and the adjacent surface of the roll 15A. The embodiments of FIGS. 2 and 3 have particular application to lower speed coaters and provide a means for converting existing roll coating machines to operate in accordance with the apparatus and method of the present invention. The apparatus and arrangement as shown in FIG. 3 is particularly useful for coating relatively heavy webs, such as board and the like, in which a "size press" effect is achieved within the nip formed between rolls 14A and 14B.

The invention further includes means by which the exit angle of the web may be adjusted as it leaves the backing roll 15 or 15A. For this purpose a roll 55 is shown as being mounted on an arm 56 for movement about an axis which is generally transverse to the direction of upward movement of the web 20 from the backing roll. As illustrated by the broken lines in FIG. 2, fine adjustments may be made in the exit or lead angle of the web 20 from the backing roll, which adjustments are useful in controlling the doctoring effect of the blade 35A. The web leaves the roll 55 with the blade coated side up for delivery to a dryer, substantially as described in connection with the embodiment of FIG. 1. The roll 55 may be a driven chill roll or an air flotation roll.

The embodiments shown in FIGS. 4 and 5 illustrate further arrangements by which existing roll coaters may be utilized in the practice of the present invention. In FIG. 4, an inclined roll coater is shown in which the applicator roll 15B is positioned in inclined relation to the metering roll 14B. Again, the web 20 is brought up in engagement with the roll 15B, with minimum wrap, and the adjustably mounted jet applicator 30B is shown as applying a quantity of coating along an unsupported length of the web before it comes into engagement with the roll 15B.

FIG. 4 illustrates a further arrangement by which both the lead-in and lead-out rolls may be adjusted to control the extent of angular contact of the web with the applicator roll, both before and after the doctor blade 35B. Thus a lead-in roll 60 may be mounted similarly to the roll 55 for limited movement in a direction transverse to the direction of web movement, so that movement of the roll 60 as indicated by the arrows associated therewith varies the angle of wrap.

The invention is shown in FIG. 5 as applied to a vertical roll coater in which the metering roll 14C receives its coating material from an underlying pan 62 and transfers the same to the applicator roll 15B. The arrangements of the adjustably mounted fountain 30 and guide roll 60 are the same as in FIG. 4.

It will thus be seen that the invention provides both method and apparatus for the two side coating of a web of paper, utilizing the advantages of a conventional roll-type coater on the one hand, and applying thereto the unique advantages of a non-contacting fountain jet coater to coat the exposed side, while bringing the web in a generally vertically upward direction in partially wrapped relation to a coating roll, for the purpose of presenting the blade side up for easy viewing and subsequent drying. The concept of the invention lends itself to the conversion and utilization of existing roll coater apparatus, by the addition of a fountain and doctoring blade, to achieve the objects and advantages of the present invention and to permit coating on both sides.

The invention has particular utility in the application of carbonless coating materials, since the coating of different materials on the opposite sides of the web may be accurately controlled by the present invention and method, and thereby preventing the intermixing of different noncompatible coating materials. The invention has the advantage of providing the ability to apply to both sides of a web either similar or dissimilar coatings while presenting the blade side up for drying or cooling systems. It minimizes sheet stress during the simultaneous application of coating liquids in view of the fact that the web partially wraps the backing roll at a single coating station.

Thus the coater of this invention can handle and coat extremely light weight papers with a minimum of web breaks. The smoothing rolls 25–28 of the embodiment of FIG. 1 provide a means of changing web direction while smoothing the wet coated surface. Similarly, the chill roll 55 of the embodiments of FIGS. 2–5 may also comprise a driven smoothing roll to smooth the back coated surface, in the manner defined in connection with rolls 25–28, while providing a means for changing web direction to present the blade side up.

While the methods herein described and the forms of apparatus for carrying these methods into effect constitute preferred embodiments of this invention, it is to be understood that the invention is not limited to these precise methods and forms of apparatus, and that changes may be made in either without departing from the scope of the invention.

What is claimed is:

1. Apparatus for coating a web of paper which is adapted to apply different coating materials to the opposite sides of the web in a single pass through the apparatus, comprising:

(a) a coating roll mounted with the axis thereof in fixed position, (b) a fixed guide roll cooperating with said coating roll to maintain an otherwise unsupported lead-in portion of the web to be coated travelling generally upwardly from said guide roll to said coating roll, (c) a second guide roll supporting a lead-off portion of the web travelling generally upwardly from said coating roll and cooperating with said first guide roll to establish the extent of wrap of said coating roll by the web.

(d) means mounting at least one of said guide rolls for adjustment with respect to said coating roll to vary the extent of wrap of said coating roll by the web, (e) applicator means for applying a metered quantity of a coating material to said coating roll at a location remote from the portion of said coating roll wrapped by the web for application of such coating material by said coating roll to the surface of the web which contacts said coating roll, (f) non-contacting coating fountain means positioned to direct [ametered] *a metered* quantity of a coating material against the other surface of said lead-in portion of the web, and (g) a doctor blade mounted to engage said other surface of the web along the portion thereof wrapping said coating roll to remove excess quantities of the coating material applied to the web by said fountain means.

2. Coating apparatus as defined in claim 1 further comprising means for adjusting said fountain means with respect to said coating roll to vary the location at which said fountain means [applied] *applies* coating material to the web.

3. Coating apparatus as defined in claim 1 wherein said adjustably mounted guide roll is said first guide roll and said mounting means therefor provide for varying the path and extent of said lead-in portion of the web, and further comprising means mounting said fountain means for movement with respect to said coating roll to vary the location at which said fountain means applies coating material to the web.

*4. Apparatus for applying a coating to both surfaces of a moving web comprising in combination:*

*(a) means for advancing the web including a cylindrical horizontal back-up roll having a smooth back-up surface for receiving and supporting a first surface of a web as the web is advanced,*

*(b) guide roll means spaced away from said back-up roll for directing the path of the web to and from said back-up roll and establishing the degree of wrap of said back-up roll by the web,*

*(c) first applicator means positioned ahead of the location where the web engages said back-up roll for applying a first coating to the surface of said roll so that the coating is transferred to a first surface of the web in a coating zone,*

*(d) a second applicator means having means for applying a coating to the second surface of the web in said coating zone so that the web is coated on both surfaces as it leaves said back-up roll, and*

*(e) means for maintaining the web under tension pressing the web against said first coating on said back-up roll.*

*5. Apparatus constructed in accordance with claim 4 for applying coating to both surfaces of a moving web and further comprising means for adjusting said guide roll means with respect to said back-up roll to vary the extent of wrap of said back-up roll by the web.*

*6. Apparatus constructed in accordance with claim 4 for applying coating to both surfaces of a moving web:*

*wherein said second applicator means has a trailing blade with the blade in pressure engagement with the web in said coating zone with means for supplying coating to the web in advance of the trailing edge of said blade so that the blade smooths the layer of coating on the second surface of the web and the blade pressure aids in the transfer of coating from the roll to the first surface of the web.*

*7. Apparatus constructed in accordance with claim 4 for applying coating to both surfaces of a moving web wherein said first applicator means applies a sizing to the surface of said back-up roll.*

*8. The method of coating both surfaces of a traveling web comprising the steps of:*

*(a) guiding the web into engagement with a moving back-up surface,*

(i b) *applying a first coating to said back-up surface in advance of the location where it is engaged by the web so that said coating is transferred from said back-up surface to the web,*

*(c) applying a coating to the second surface of the web while it is supported by said back-up surface and substantially simultaneously applying a resilient force to the web to aid in the transfer of the first coating from said back-up surface to the web, and*

(*d*) *driving said back-up surface at a different speed from that of the traveling web.*

*9. The method of coating both surfaces of a traveling web comprising the steps:*

(*a*) *guiding the web into engagement with a moving back-up surface at a predetermined first location thereon,*

(*b*) *applying a first coating to said back-up surface in advance of the location where it is engaged by the web so that said coating is transferred from said back-up surface to the web,*

(*c*) *pressing the web against said coating on said back-up surface only by maintaining the web under tension during travel thereof from said first location to a second location on said back-up surface, and*

(*d*) *applying a coating to the second surface of the web at said second location and substantially simultaneously applying a resilient force to the web to aid in the transfer of coating from said back-up surface to the web.*

*10. The method of coating both surfaces of a traveling web in accordance to the steps of claim 9 wherein the application of coating to the second surface of the web includes the action of a trailing blade which applies a resilient force to the second web surface for smoothing the coating on said second surface and which resiliently forces the web toward said back-up surface to aid in the transfer of coating from the back-up surface to said first surface of the web.*

* * * * *